Jan. 13, 1959   D. A. WILHELMSON   2,868,911
SPEED AND ACCELERATION RESPONSIVE DEVICE
Filed May 9, 1956   2 Sheets—Sheet 1
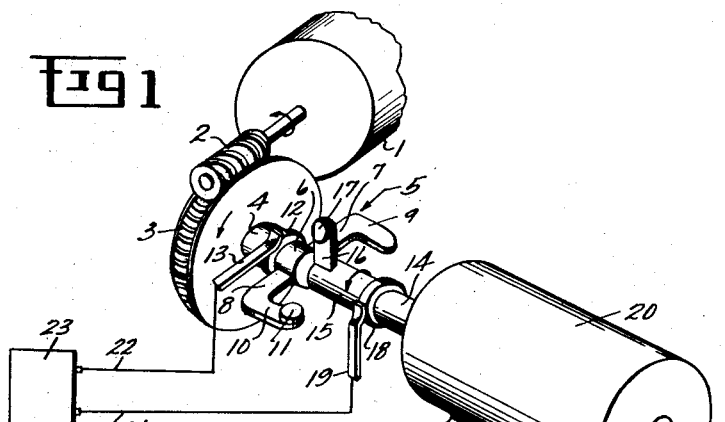
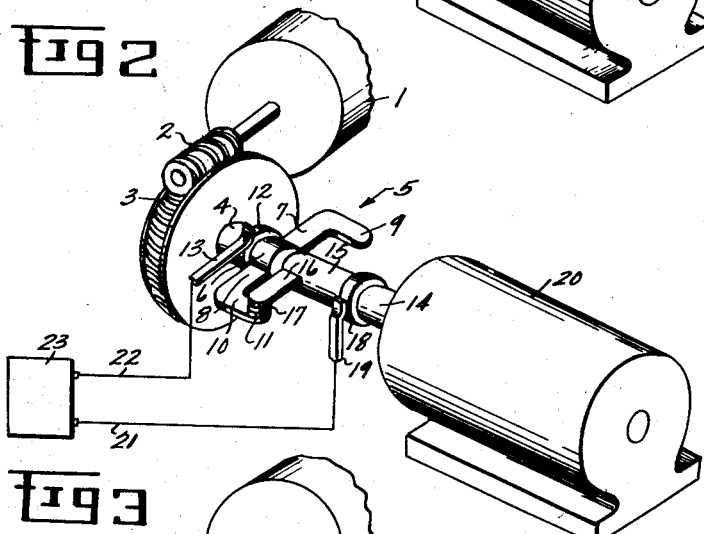
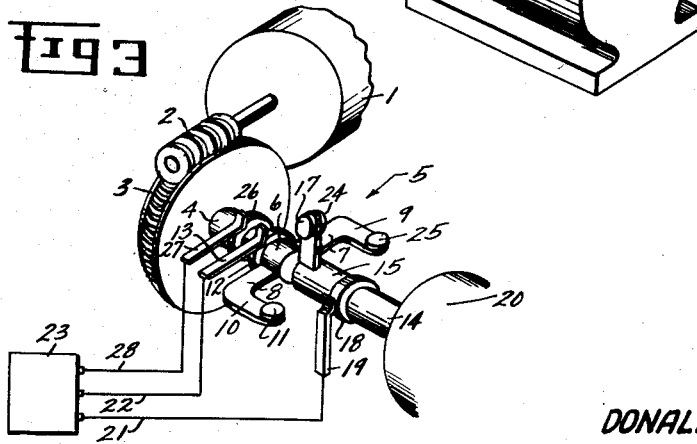
INVENTOR.
DONALD A. WILHELMSON
BY
Harold H Green Jr.
HIS ATTORNEY Jan. 13, 1959 D. A. WILHELMSON 2,868,911
SPEED AND ACCELERATION RESPONSIVE DEVICE
Filed May 9, 1956 2 Sheets-Sheet 2
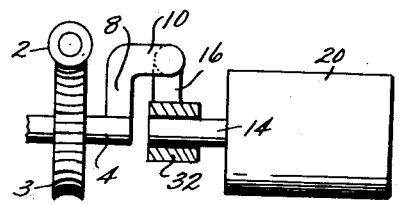
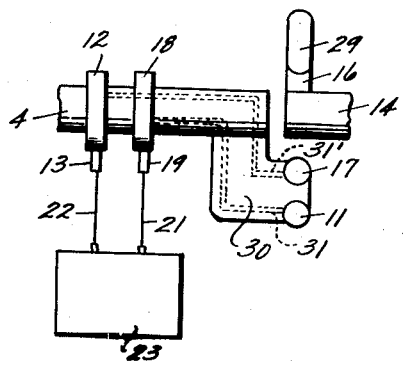
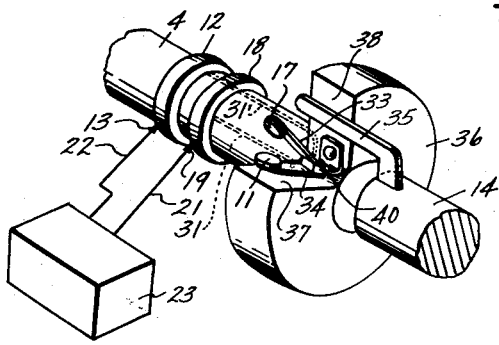
INVENTOR.
DONALD A. WILHELMSON
BY Harold H Green Jr
HIS ATTORNEY United States Patent Office 2,868,911
Patented Jan. 13, 1959

2,868,911
SPEED AND ACCELERATION RESPONSIVE DEVICE

Donald Allen Wilhelmson, Lawrence Park Township, Erie County, Pa., assignor to General Electric Company, a corporation of New York Application May 9, 1956, Serial No. 583,661

7 Claims. (Cl. 200—61.46)

This invention relates to speed and acceleration responsive devices, and more particularly to such devices as associated with rotating machines.

It is frequently necessary to limit the speed of certain machines in accordance with design requirements to prevent damage or destruction to the machine resulting from the severe centrifugal forces imposed by excess rotative speed. Other applications may require a limiting of the speed of acceleration of the machine from starting to a constant speed condition.

An example of the above applications, which represent only one use of this invention, is the turbine-driven starter used in conjunction with a turbojet engine. In this application, the starter itself is the subject of overspeed protection rather than the engine to be started since the turbine of the starter is rotated at very high speed in order to acquire sufficient energy in the system to rotate the engine to be started. Therefore, any undue variation in this speed in excess may cause damage to the starter and necessitate replacement thereof.

An object of this invention is to provide a device for limiting the maximum speed of a rotating machine with respect to the speed of a reference rotating apparatus.

Another object of this invention is to provide a speed-responsive device wherein a torque differential between rotating contacts is employed to maintain contact engagement.

A further object of this invention is to provide a device for limiting the acceleration of a rotating machine to the preset acceleration of a reference rotating apparatus.

Briefly stated, in accordance with one aspect of this invention, there is provided a contact to be rotated in a circular path by the rotating machinery whose speed is to be limited. Another contact is arranged to be rotated at a constant speed by the reference apparatus, in the same circular path and in the same direction as that of the first-mentioned contact. In an overspeed condition of the machine, the two contacts will move away from each other while an underspeed condition results in the rotating reference apparatus attempting to drive the machine. This driving force serves to maintain engagement between contacts.

This invention will be better understood from the following description taken in connection with the accompanying drawings and its scope will be pointed out in the following claims.

Fig. 1 illustrates one embodiment of this invention showing the contacts of the control element in the open position.

Fig. 2 illustrates the embodiment of Fig. 1 wherein the contacts are maintained in a closed position.

Fig. 3 discloses a second embodiment of this invention employing contacts for making and breaking a circuit under conditions of overspeed and underspeed.

Fig. 4 shows another embodiment of this invention employing a friction coupling between a contact and a shaft.

Fig. 5 shows still another embodiment of this invention wherein a plurality of contacts are mounted on one shaft, and a bridging contact is mounted on the other shaft to complete a circuit between the contacts on the first shaft.

Fig. 6 shows a modification of the embodiment of Fig. 5 wherein an arm on one shaft actuates the engagement of the contacts mounted on the other shaft.

Referring to Fig. 1 of the drawings, 1 represents generally the machine the speed of which is to be limited. A gear drive shown by gears 2 and 3 is connected to the machine 1 for reducing the speed input of machine 1 when it is desired to limit the speed of a very high-speed machine. In yet other applications, this gear drive may be desirable in order to provide drive ratios that correspond, for the purpose of this invention, to rotating reference apparatus of standard speeds. However, the gear drive is not an essential part of this invention and may be substituted by other drive means or alternatively may be eliminated where the speed of the machine and the reference motor are to be the same. A shaft 4 is arranged to be driven by gear 3 and has affixed on its free end a U-shaped member indicated generally as 5. The U-shaped member 5 is shown as having a center cylindrical section 6 which is mounted on shaft 4. A pair of arms 7 and 8 extend radially from the cylindrical sections 6 to form the base of the U member. These arms 7 and 8 include extensions shown, as arms 9 and 10 which lie parallel to shaft 4 and constitute the legs of the U member 5. An electrical contact 11 is mounted on arm 10 to be rotated therewith. In order to establish circuitry to this contact 11, there is provided a slip ring 12 on the shaft 4 with a suitable brush 13 in engagement therewith. The radial arms 7 and 8, including projecting arms 9 and 10, together with cylindrical section 6 and slip ring 12, may be of a one-piece construction and mounted on shaft 4 as a unit. It is to be noted, however, that the unitary construction is not necessary for the purposes of this invention, and such a unit may be assembled from individual parts.

A shaft 14 is disposed in axial alignment with and spaced from shaft 4. Mounted on the end of shaft 14 is a contact carrying assembly shown as having a base structure 15 in the form of a cylinder or sleeve from which there extends a radial arm 16. Affixed to the arm 16 is a contact 17 which is moved in a circular path by means of the rotation of shaft 14. Circuitry is established to this contact 17 through the employment of a slip ring 18 mounted on shaft 14, and brush 19 in engagement with said slip ring 18. Arm 16 together with sleeve 15 and slip ring 18 may be of a one-piece construction and mounted on shaft 14 as a unit. This contact-carrying assembly is similar to that of the U member 5 and may be constructed from individual parts as previously described for the U member.

The arms 9 and 10 of the aforementioned U-shaped member 5 and the arm 16 are of a flexible character rather than rigid. The employment of flexible arms contributes a desired wiping action to the contacts upon initial engagement, while upon the occurrence of an abrupt engagement, the flexibility of the arms act as a shock absorber to prevent damage to the assembly and to reduce contact bounce. It should be noted, however, that the flexibility is of a necessity limited in that the arms 9, 10, and 16 must be sufficiently rigid to withstand driving forces imposed thereon as will be evident as the description proceeds. An additional desirable feature in the arrangement of the arms is the relationship of the arm 16 to the arm 10 of the U member 5. In Fig. 1 the parallel arms 9 and 10 of the U member 5 project forwardly and overlie shaft 14 while arm 16 is perpendicular to the arm 10. In this manner, the resiliency of the assembly is increased by taking advantage of the twisting or torque action on arm 8 in addition to the bending action which may be imposed on the arms 10 and 16.

Any suitable reference apparatus may be employed with this invention. One form of such apparatus is shown in Fig. 1 as an electric motor 20. This motor 20 is arranged to drive shaft 14 and thereby rotate contact 17 in a circular path. Contact 11, on the end of projecting arm 10, is rotated by shaft 4 in the same direction as contact 17 and in the same circular path. Since contacts 11 and 17 describe the same circular path of rotation, they will, at certain predetermined relative speeds, meet in abutting relationship or break therefrom to establish or discontinue a suitable circuit for the control apparatus. This control circuit is shown generally as leads 21 and 22, and the control apparatus as schematic 23. The control apparatus itself forms no part of the present invention, since the type of control would depend upon the type of machine whose speed is to be limited. As an example, the control may be a device for changing the throttle setting of an internal combustion engine, or a voltage regulator for electrical machines or other control devices well known in the art.

At the beginning of the operation, the reference motor 20 rotates the contact arm 16 with its contact 17 at a greater speed than that of the arm 10 and its contact 11 are driven through gear 3 by the machine 1. This difference in driving torque, or the overrunning effect of the reference motor 20 in attempting to drive the machine 1, maintains the contacts in firm engagement. Upon reaching the predetermined speed of machine 1, the reference motor 20 then rotates at a constant speed equivalent to the speed of the gear 3 relative to the machine 1. When the machine 1 enters the condition of underspeed, the reference motor 20, through its developed torque, will attempt to drive machine 1 to maintain necessary engagement of the contacts 11 and 17. If, on the other hand, the machine 1 enters an overspeed condition, the arm 10 moves away from arm 16 and the engagement of contacts 11 and 17 is broken. If the overspeed condition continues, arm 10 continues to move away from arm 16 until such time as arm 9 overtakes and engages the back of the arm 16. In this situation, the arm 9 will be attempting to drive the reference motor 20, through engagement with arm 16 and is, therefore, suitably insulated to prevent electrical contact. The insulation may take the form of a cover for arm 9 or alternatively the arm itself may be manufactured from a non-conducting material.

This invention may be employed as an acceleration-responsive device to operate in a similar manner to its use as a speed sensing device. When the invention is to be used as an acceleration-responsive device, it is desirable to have the moment of inertia of the reference motor rotor adjustable in any well-known manner such as having weights movable to and from the longitudinal axis of the rotor. A desired or maximum acceleration limit is determined for the machine to be regulated and its corresponding moment of inertia preset in the rotor of the reference motor 20. This moment of inertia is equal to the developed torque of the reference apparatus divided by the acceleration desired, or in other words, it refers to the amount of inertia required to limit the acceleration of the reference apparatus to that allowed in the machine 1. Acceleration of the machine 1 rotates contact 11 which remains in engagement with contact 18 driven by the reference motor 20, only so long as the acceleration of the machine 1 and contact 11 does not exceed the acceleration limit as preset in the rotor of the reference motor 20. When the acceleration limit is exceeded, the arm 10 by machine 1, contact 11 will move away from contact 18, thereby interrupting the electrical circuit therebetween to actuate the control apparatus.

In some applications, it may be desirable to have a circuit established upon overspeed of the machine 1. This may be accomplished merely by positioning the contact 17 on the reverse face of arm 16 and interchanging arm 10 with insulated arm 9. Therefore, if contact 11 is mounted on arm 9 and contact 17 is affixed to the opposite face of arm 16, a circuit will be established when machine 1 rotates contact 11, now on arm 9, during overspeed to abut contact 17 on the reverse face of arm 16.

This invention may also be employed to establish a circuit upon both overspeed and underspeed conditions. Fig. 3 indicates the necessary modifications for accomplishing this purpose. An additional contact 24 is mounted oppositely to contact 17 on arm 16 and an additional contact 25 is mounted on arm 9 which is now not insulated. In order to complete this circuit to the control apparatus 23, a third slip ring 26 is mounted on shaft 4. A third brush 27 and lead wire 28 are employed with the slip ring 26 to complete the additions for this modification. It may be seen by this arrangement that when the machine 1 attempts to overspeed, contact 25 will engage contact 24 to establish any suitable control circuit. The reference motor tends to hold back when being driven over its rated speed, and this tendency maintains firm abutment between contact 25 and contact 24. If machine 1 begins to rotate at a slower speed than that of the reference motor 20, contact 17 will overtake contact 11 to establish the circuit for underspeed control.

Best results are obtained in this speed-responsive device when a reference motor having the characteristics of an induction motor is employed. This may be described by saying that the reference motor 20 must be capable of developing a definite positive torque for all speeds up to normal running speed and a definite negative torque above that speed. For best results, this torque reversal should take place within a small change in speed. An ordinary induction motor meets these requirements since it will develop a positive driving torque at speeds less than the running speed and will hang back when there is an attempt to drive the motor above its running speed. This retardant effect on underspeed conditions and hanging back on overspeed conditions provides the firmness of engagement between contacts which is desirable for good circuitry and which also minimizes arcing and subsequent damage to the contacts. The type of reference motor is not limited to A. C. motors since D. C. motors generally exhibit the desired negative torque characteristics and would, therefore, perform satisfactorily in this invention.

Synchronous motors do not in general develop a torque at speeds other than their synchronous speeds and would not, therefore, give optimum results. However, the use of synchronous motors in this invention may be provided for by employing a slip coupling as shown in Fig. 4. Referring to Fig. 4, there is mounted on shaft 4 a radial arm 8 formed with an axially extending arm 10 having a contact 11 thereon, and overlying the shaft 14. On the end of shaft 14 is a collar 32 which maintains a slight-friction fit with the shaft 14. The friction fit may be provided for by having a sleeve of suitable friction material between the collar and the shaft or by having a split collar which is radially adjustable. Such friction devices are well known in the art, and this invention is not restricted to the employment of any particular type. Affixed to the collar 32 is a radially extending arm 16 having a contact 17 thereon. In operation, the reference synchronous motor 20 rotates at a constant speed, and in turn rotates the arm 16 through the friction collar 32. When the speed of arm 10 as driven by machine 1 decreases, the arm 16 overtakes arm 10 and engagement of the contacts 11 and 17 on these arms takes place. As a result of the speed of the reference synchronous motor 20 being now greater than that of the arm 10 driven by the machine 1, the reference synchronous motor 20 attempts to drive the machine 1 through the engaged contacts 11 and 17, and this driving force maintains the desired firmness of engagement. If the speed of the machine 1 decreases further, the reference synchronous motor 20 is placed under a greater load in attempting to drive the machine 1, and, under a predetermined load, the friction coupling 32 is provided to slip with relation to the shaft 14 to permit the reference synchronous motor 20 to continue to operate at or near synchronous speed. Thus, advantage of the developed torque of the motor available only at or near synchronous speeds is thereby obtained. This torque is employed to maintain firm contact engagement. A synchronous motor without the friction coupling would, under circumstances which diminish its speed, fail to develop at less than synchronous speed a sufficient torque to maintain the firmness of contact engagement which is desired in this invention.

Further embodiments of this invention are shown in Figs. 5 and 6, wherein the various part numerals are correlated with those of the preceding figures.

In Fig. 5, the slip rings 12 and 18 with their respective brushes 13 and 19 and leads 21 and 22 are associated with the shaft 4 only. This simplifies the arrangement by placing the circuit elements in one general locale and also eliminates the necessity of disconnecting the electrical elements upon removal of the reference motor. Contacts 11 and 17 are affixed to one side of arm 30 in side-by-side relationship and are connected to their respective slip rings 12 and 18 by means of leads 31 and 31'. A bridging contact 29 is fixed to and insulated from arm 16. The operation of this embodiment is similar to the operation as described for Fig. 1 such that upon an underspeed condition of the machine 1, the bridging contact will engage both contacts 11 and 17, thereby completing a circuit for the control apparatus 23.

In Fig. 6, the slip rings 12 and 18, the brushes 13 and 19, and the leads 21 and 22 are shown as associated with the shaft 4. A stop member consisting of a thin cylindrical section 36 with a wedge-shaped portion removed is mounted on the end of shaft 4. A mounting bracket 40 made from an electrical insulating material is affixed to the then cylindrical section 36 to rotate therewith. Mounted on opposite sides of the mounting bracket 40 are arms 33 and 34 which extend radially to form a narrow V configuration or alternatively these arms may be parallel. These arms correspond to the arm members described in the previous modifications since they are also of a flexible character. Contacts 11 and 17 are affixed to the inner sides of the arms 33 and 34 in facing relationship to each other. The contacts 11 and 17 are connected to their respective slip rings 12 and 18 by leads 31 and 31'. On the end of shaft 14 there is mounted an angle arm 35 which projects from the end of shaft 14 to a position behind the arms 33 and 34. This arm 35 may be straight instead of angled and mounted at an angle to shaft 14 to project behind arms 33 and 34. Arms 33 and 34 reside within the wedge section of the stop member along with angle arm 35. In operation, during an underspeed condition of machine 1, the angle arm 35 is moved against arm 33 to flex arm 33 towards arm 34, thus effecting engagement between their respective contacts 11 and 17. The side 37 of the removed wedge portion of the cylindrical section 36 prevents overtravel of the angle arm 35 and subsequent damage to flexible arms 33 and 34. Similarly, on conditions of overspeed, the side 38 prevents the angle arm 35 from contacting the backside of arm 34. The angle arm 35 may project in front of arm 34, thus adapting the invention to complete a control circuit for conditions of overspeed.

Although I have shown and described particular embodiments of my invention, I do not desire to be limited to the particular embodiments described, and I intend in the appended claims to cover all modifications which do not depart from the spirit and scope of my invention.

What I claim is:

1. A speed and acceleration limiting device comprising a first shaft driven by the machine whose speed and accelerations are to be limited, first electrical contact means carried by said first shaft, a second shaft spaced from and in axial alignment with said first shaft, second electrical contact means carried by said second shaft and positioned to be engageable with said first electrical contact means, means for driving said second shaft, said driving means having a preselected acceleration characteristic and a preselected maximum speed and being capable of developing a positive torque for speeds or accelerations less than said preselected values and a retardant torque for speeds or accelerations greater than said preselected values, the preselected acceleration rate of said driving means being greater than the normal acceleration of the machine whose speed and acceleration are to be limited.

2. In a speed-responsive device, the combination comprising, a first shaft arranged to be driven by the machine whose speed is to be regulated, a U-shaped member mounted on said first shaft with the legs of the U parallel to and spaced equi-distant radially from said first shaft, a first contact affixed to one of the parallel arms of said U-shaped member, a second shaft spaced from and in axial alignment with said first shaft, a radial arm mounted on said second shaft, a second contact affixed to said radial arm, said first and said second contact being arranged to rotate in the same direction while describing the same circular path, a reference motor for rotating said second shaft said reference motor having a preselected acceleration characteristic and a preselected maximum speed and being capable of developing a positive torque for speeds or accelerations less than said preselected values and a retardant torque for speeds or accelerations greater than said preselected values, said retardant torque maintaining said first and second contacts in engagement.

3. In a speed-responsive device, the combination comprising a first shaft driven by the machine whose speed is to be regulated, a U-shaped member mounted on said first shaft with the legs of the U member parallel to and spaced equi-distant radially from said first shaft, a contact on the end of each leg of said U member, a second shaft spaced from and in axial alignment with said first shaft, a radial arm mounted on said second shaft, contacts affixed to each side of the free end of said radial arm, a reference induction motor arranged to rotate said second shaft, said contacts on said U member and said contacts on said radial arm being mounted to describe the same circular path of revolution, whereby one set of contacts from the said U member and the said radial arm meet upon conditions of overspeed of said machine and another set of contacts from said U member and said radial arm meet on conditions of underspeed of said machine.

4. In a speed and acceleration-responsive device, the combination comprising a first shaft driven by the machine whose speed is to be regulated, a second shaft spaced from and in axial alignment with said first shaft, spaced apart contacts mounted on one of said shafts, an arm on the other of said shafts, a reference induction motor for driving said second shaft at a constant speed, whereby an underspeed condition of one of said shafts causes said arm member to effectuate engagement of said spaced apart contacts.

5. In a speed-responsive device, a first shaft driven by the machine whose speed is to be regulated, a plurality of resilient arms carried by said first shaft, contacts mounted on said flexible arms such that contact engagement may be initiated through flexing of said arms, a second shaft spaced from and in alignment with said first shaft, an arm member mounted on said second shaft, said arm member extending into the plane of rotation of said resilient arms whereby, upon an underspeed in speed of said first shaft, said arm member moves one of said flexible arms for engagement of the contacts carried thereby, and means for limiting the movement of said flexible arms.

6. In a speed and acceleration-responsive device, the combination comprising a first shaft driven by the machine whose speed is to be regulated, a second shaft spaced from and in axial alignment with said first shaft, a constant speed reference motor for driving said second shaft, a first contact means carried by said first shaft, second contact means carried by said second shaft, slip means disposed between one of said contact means and its carrying shaft to permit limited relative motion therebetween, said first and said second contact means describing upon rotation the same circular path whereby an underspeed in one of said shafts effects engagement of said first and said second contact means, said slip means maintaining a predetermined force between the engaged contact means at speeds of said machine other than the constant speed of said reference motor.

7. In a speed and acceleration-responsive device, the combination comprising a first shaft driven by the machine whose speed is to be regulated, a first contact carried by said first shaft, a second shaft spaced from and in axial alignment with said first shaft, a synchronous motor for driving said second shaft, a friction collar mounted on said second shaft, a second contact carried by said collar, said first and said second contacts describing upon rotation the same circular path whereby an underspeed condition of said first shaft effects engagement of said contacts, said friction collar being arranged to slip about said second shaft at speeds of said machine other than the constant speed of said synchronous motor to maintain firm contact engagement.

References Cited in the file of this patent

UNITED STATES PATENTS

| | | |
|---|---|---|
| 1,650,786 | Burnett | Nov. 29, 1927 |
| 2,263,512 | Logan et al. | Nov. 18, 1941 |
| 2,543,077 | Treseder | Feb. 27, 1951 |
| 2,693,559 | Quereau et al. | Nov. 2, 1954 |
| 2,731,630 | Karlson | Jan. 17, 1956 |
| 2,735,059 | Schaelchlin | Feb. 14, 1956 |